(12) United States Patent
Crawford et al.

(10) Patent No.: US 7,435,341 B2
(45) Date of Patent: *Oct. 14, 2008

(54) PRESSURE RELIEF VALVE FOR FILTER ASSEMBLY

(75) Inventors: Brian Scott Crawford, Bessemer City, NC (US); Michael David Adams, Bessemer City, NC (US)

(73) Assignee: Wix Filtration Corp LLC, Gastonia, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/545,186

(22) Filed: Oct. 10, 2006

(65) Prior Publication Data
US 2007/0029237 A1    Feb. 8, 2007

Related U.S. Application Data

(63) Continuation of application No. 10/445,263, filed on May 27, 2003, now abandoned.

(51) Int. Cl.
*B01D 27/08* (2006.01)
*B01D 27/10* (2006.01)

(52) U.S. Cl. .................. 210/130; 210/443; 210/453; 210/493.3; 210/DIG. 17

(58) Field of Classification Search .......... 210/453, 210/493.3, DIG. 17, 443, 130, 132, 136, 210/436, 431, 421, 444; 55/313, 521, 310, 55/311, 312; 137/544–550, 511–543.23
See application file for complete search history.

(56) References Cited

U.S. PATENT DOCUMENTS

| | | | |
|---|---|---|---|
| 1,195,983 A * | 8/1916 | Farmer | ........................ 55/311 |
| 2,563,548 A | 8/1951 | Plante | |
| 2,593,293 A | 4/1952 | Giauque | |
| 2,672,984 A * | 3/1954 | Russell | ........................ 210/282 |
| 3,000,505 A | 9/1961 | Scavuzzo | |
| 3,194,401 A | 7/1965 | Banker | |

(Continued)

FOREIGN PATENT DOCUMENTS

JP     2001029712 A  *  2/2001

OTHER PUBLICATIONS

Office Action from USPTO dated Feb. 22, 2008 for Serial No. 29/265,352.

*Primary Examiner*—Terry K Cecil
(74) *Attorney, Agent, or Firm*—Honigman Miller Schwartz & Cohn LLP

(57) ABSTRACT

An oil filter assembly includes a pressure relief valve adaptable to wide variety of environments while maintaining ease of assembly and manufacture. The pressure relief valve of this invention also occupies a minimal amount of space within the filter assembly as compared to conventional valve arrangements. In the preferred embodiment, the three-piece filter system comprises a base, a deep pocket filtering media, and a housing shell. The unitary filtering media and cap member are formed as a replaceable component that seats into the housing shell without a center tube or other outside support. When the housing shell is threaded onto the base, the cap member is sandwiched between a ledge on the shell and a seal on the base. The pressure relief valve allows fluid to continue to flow in the event the filter element becomes clogged whereby the valve provides ease of assembly, reduced cost, and reduced valve size.

39 Claims, 9 Drawing Sheets

U.S. PATENT DOCUMENTS

| | | | | |
|---|---|---|---|---|
| 3,281,513 A | | 10/1966 | Stripp | |
| 3,367,507 A | * | 2/1968 | Hultgren | 210/434 |
| 3,397,518 A | | 8/1968 | Arthur | |
| 3,397,786 A | * | 8/1968 | Hultgren | 210/132 |
| 3,506,475 A | | 4/1970 | MacDonnell | |
| 3,591,004 A | | 7/1971 | Roosa | |
| 4,418,662 A | | 12/1983 | Engler et al. | |
| 4,969,994 A | * | 11/1990 | Misgen et al. | 210/232 |
| 5,066,391 A | | 11/1991 | Faria | |
| 5,084,162 A | | 1/1992 | Conti | |
| 5,171,430 A | * | 12/1992 | Beach et al. | 210/94 |
| 5,391,212 A | | 2/1995 | Ernst et al. | |
| 5,569,373 A | | 10/1996 | Smith et al. | |
| 5,584,987 A | | 12/1996 | Mules | |
| 5,795,361 A | | 8/1998 | Lanier, Jr. et al. | |
| 5,817,232 A | | 10/1998 | Roll et al. | |
| 5,830,371 A | | 11/1998 | Smith et al. | |
| 6,068,763 A | | 5/2000 | Goddard | |
| 6,165,242 A | | 12/2000 | Choi | |
| 6,387,259 B1 | | 5/2002 | Roll | |
| 6,488,848 B1 | | 12/2002 | Smith | |
| 6,568,539 B1 | | 5/2003 | Deibel et al. | |
| 6,579,448 B2 | * | 6/2003 | Dworatzek | 210/130 |
| 6,595,372 B1 | | 7/2003 | Minowa et al. | |
| 6,824,581 B1 | | 11/2004 | Tate et al. | |
| 6,911,141 B2 | * | 6/2005 | Stamey et al. | 210/85 |

* cited by examiner

US 7,435,341 B2

PRESSURE RELIEF VALVE FOR FILTER ASSEMBLY

RELATED APPLICATION

This is a continuation of application Ser. No. 10/445,263, filed May 27, 2003, now abandoned.

BACKGROUND OF THE INVENTION

1. Field of the Invention

This invention relates to filters for filtering fluids such as engine oil, coolant, fuel, hydraulic or transmission fluid.

2. Description of Related Art

Fluid filters are used to remove contaminants from fluid, such as engine oil. Internal combustion engines use oil to lubricate bearings and reduce friction. This oil is circulated through the engine and carries contaminants such as metal particles, carbon particles and dirt which may cause harm to the engine. In order to effectively lubricate the engine, engine oil is passed through a filter to remove the contaminants before the oil is recirculated into the engine. The typical oil filter is attached to an internal combustion engine at the oil filter receptacle.

Engine oil passes through a discharge opening in the oil filter receptacle, into a fluid filter and then into the engine lubrication system through an oil inlet pipe. A filter element in the fluid filter removes contaminates from the oil before it reenters the engine through the oil inlet pipe. Because of the dynamic nature of this process, oil filters must be sealed to protect from oil leaking into the atmosphere.

Oil filters have traditionally been of a disposable type creating a great environmental concern. Used oil filters are disposed of in landfills or by incinerating. Recent improvements in the art have separated the filter elements from the filter canister allowing users to dispose of only the filter element and thus reducing the quantity of waste material. However, a large volume of waste is still generated by disposing of the filter element.

For both reusable and disposable filter assemblies, there is a need for a fluid filter having a pressure relief valve to allow fluid to continue to flow in the event the filter element becomes clogged whereby the valve provides ease of assembly, reduced cost, and reduced valve size.

SUMMARY OF THE INVENTION

The present invention provides a unique oil filter assembly including a pressure relief valve that is adaptable to wide variety of environments while maintaining ease of assembly and manufacture. The pressure relief valve of this invention also occupies a minimal amount of space within the filter assembly as compared to conventional valve arrangements.

In the preferred embodiment, a three-piece filtering system replaces the standard style of OE and aftermarket automotive liquid filters, whereby the filtering system provides an environmental approach with respect to recycling of the filter media portion. The three-piece filter system comprises a base, an end cap with a deep pocket filtering media, and a housing shell. A pressure relief valve is provided in the end cap to allow fluid to flow in the event the filter element becomes clogged.

The base is adapted to be fitted/threaded onto an engine block, with a sealing surface that provides a seal with the engine block. The filtering media and cap member is placed pleated-media end down into the housing shell. The filtering media self centers and the housing shell with the filtering media attached is sealingly affixed to the base.

The unitary filtering media and cap member are formed as a replaceable component that seats into the housing shell without a center tube or other outside support. When the housing shell is threaded onto the base, the cap member is sandwiched between a ledge on the shell and a seal on the base.

The filter media itself is a solid block and has no center tube. The filter media is a solid pleated pocket design affixed to the cap member. In the preferred design, the filter element is square rather than round to increase surface area. The structure of the filter media eliminates the center tube and compression spring and bottom plate typically used inside the shell of a spin-on filter assembly; thus, the number of parts is reduced and assembly is simplified.

The end cap member includes a one-piece, U-shaped pressure relief valve assembly to allow fluid to continue to flow in the event the filter element becomes clogged. The one-piece valve is constructed so that different sizes, materials, thicknesses, and preloading of the valve can produce different pressure relief settings. Additionally, the angle of the valve with respect to the end cap member can adjust the pre-load to allow for varying pressure settings.

Further features and advantages of the invention are pointed out with the description of the preferred embodiment, drawings and claims of this application.

BRIEF DESCRIPTION OF THE DRAWINGS

FIG. 3b is a top view of the cap member illustrated in FIG. 3a.

DETAILED DESCRIPTION OF PREFERRED EMBODIMENTS

Figure 1:
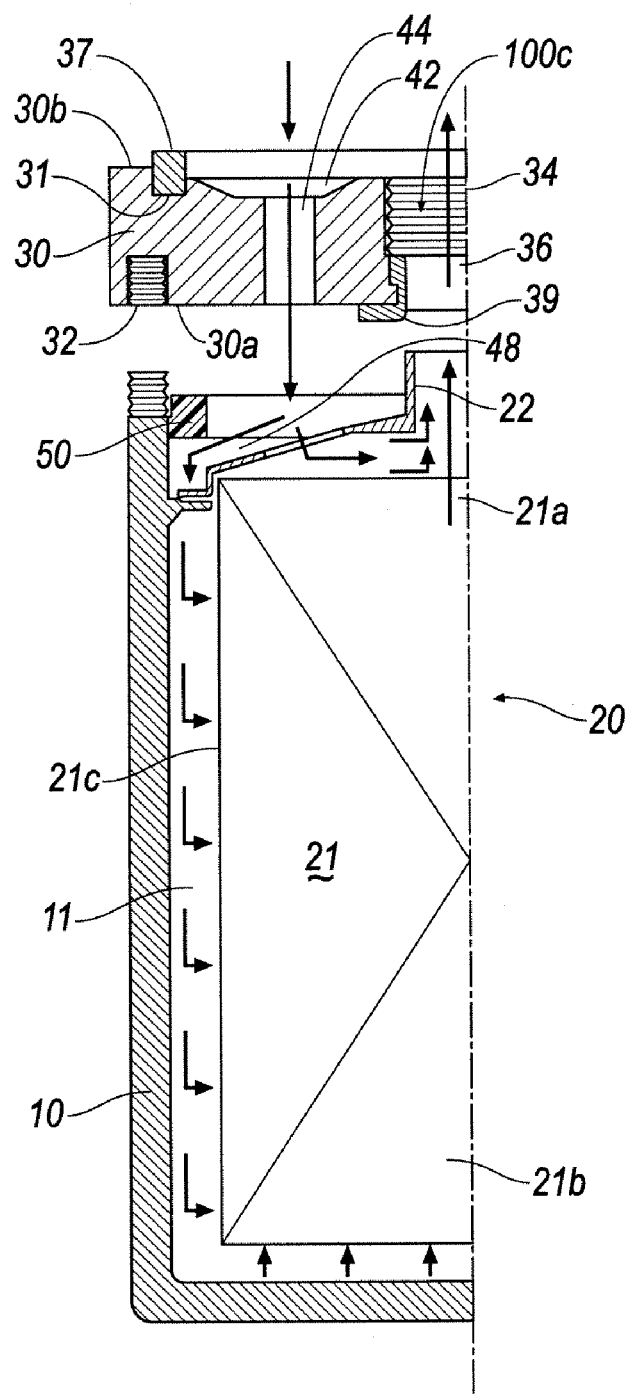
FIG. 1 is a detail section view of a reusable three-piece fluid filter including the base, the housing shell, and the filtering element.

One form of the invention is illustrated and described herein as an oil filter on an engine. FIG. 1 illustrates reusable fluid filter comprising a housing shell 10, a filter element 20, and a threaded base 30.

As illustrated in FIG. 1, the threaded base 30 has external threads 32 and internal threads 34. External threads 32 are used to threadably mount the base 30 to a standard reusable filter housing shell 10. Internal threads 34 are machined to allow the fluid filter to be adapted to a wide variety of engines produced by various manufacturers. An engine block (not shown) typically has an oil filter stub (not shown) to allow a fluid filter to be threadably attached via internal threads 34.

Filtered oil port 36 is formed in base 30 to allow filtered fluid to exit the reusable fluid filter after passing through the cap member 22. Threaded base 30 is designed to be an inexpensive device to allow the reusable oil filter to be adapted to a wide variety of engine blocks. Internal threads 34 are formed to fit OEM threads of the oil filter stub (not shown) and adapts the reusable fluid filter to a wide variety of engines while reducing the costs to manufacture, package and distribute reusable fluid filters.

The base 30 has an inside face 30a and an outside face 30b. Outside face 30b has an annular flat surface and an annular channel cut 31 formed in the annular flat surface. 0-ring 37 is mounted in annular channel 31 to form an oil tight seal between base 30 and the engine block when base 30 is threadably attached to filter stub. A second annular channel (not shown) in outside face 30a may also be used to form an oil tight seal with a second 0-ring mounted in the second channel to adapt the base 30 to additional manufacturers engines. Unfiltered oil leaves engine block through unfiltered oil ports in the filter stub. Unfiltered fluid channel 42 is formed in outside face 30a and allows unfiltered oil to pass through unfiltered fluid inlet orifices 44, through base 30 and into the unfiltered fluid compartment 48 defined between the base 30 and the cap member 22. Unfiltered fluid channel 42 helps filter element 20 adapt to a wide variety of engines and other fluid systems.

Assuming normal pressure conditions and operation of the filter, the unfiltered oil passes from the compartment 48 through passageways formed at the peripheral edges of the cap member 22 and into a canister area 11 between the housing shell 10 and filter element 20.

Unfiltered fluid inlet orifices 44 may be formed at an angle to the axis of canister 10 in order to create a turbine or a swirling motion of unfiltered fluid in the unfiltered fluid compartment 48.

Filter element 20 comprises a reusable filter media 21 and cap member 22. The reusable filter media 21 comprises a disposable element having a first end 21a, a second end 21b, and an outside wall 21c. The first end 21a of the deep pocket filter media 21 is attached to the cap member 22. Unlike conventional filter media of conventional oil filters, the filter media 21 is a pleated pocket design similar to conventional panel air filtration systems. The filter media 21 is in the form of a solid block of a filter material having no central opening therethrough. In other words, the block of the filter media 21 substantially occupies a central portion of the outer shell 10. In the preferred embodiment, the filter media 21 is square—rather than round—when viewed from the top to increase surface area. Moreover, as illustrated in FIGS. 3b and 4a-4d, the block of filter media 21 includes a continuous series of pleats extending across an entire width thereof such that no substantial void (or opening) exists in or through the central portion of the outer shell 10. In a conventional round-type, media style filter for spin-on liquid filter assembly, the typical area of the filter media is 357.4 in$^2$. Of course, these dimensions relate to only one example of a filter size; other filter sizes achieve similar benefits. For the solid, square pleat block of this invention, the corresponding filter area is 410.6 in$^2$ to fit the same size housing shell. With the solid square structure of the filter media 21, the stability and rigidity of the filter media is enhanced. In other words, the spacer/comb design provides even pleat spacing under pressure while giving rigidity to the deep pocket media element 21. As a result, the solid structure of the filter media 21 eliminates the central opening therethrough as well as the compression spring and bottom plate typically used inside the shell of a spin-on filter assembly. Thus, the number of parts is reduced with the design of this invention.

Figure 2:
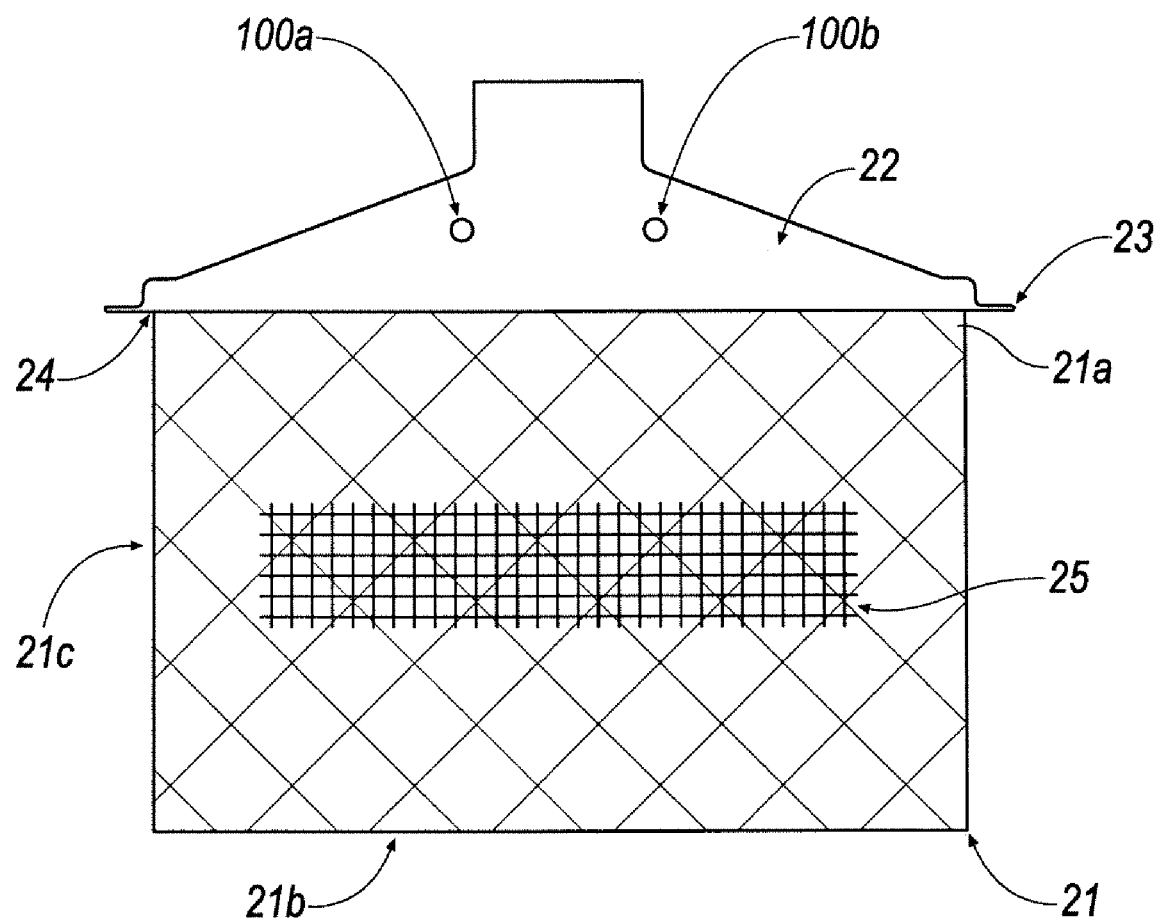
FIG. 2 is a side view of the reusable fluid filter media and associated cap member.

In a preferred embodiment, the filter media 21 may be torn away from or otherwise removable from the cap member 22 to further enhance the environmental benefits of this invention. In one embodiment of this invention, the filter media 21 is provided with a disposable mesh 25 (see FIG. 2), which is woven from a material such as metallic wire.

The cap member 22 is preferably metal or plastic but other suitable materials may be used without departing from this invention.

As shown in FIG. 1, the unitary filtering media 21 and cap member 22 are formed as a replaceable assembly that seats into the housing shell 10 without a center tube or other outside support. The cap member 22 is formed with a rim portion 23 defining a mounting surface 24, which is adapted to rest on the inwardly projecting surface or ledge 12 provided on the inner surface of the housing shell 10. When the housing shell 10 is threaded onto the base 30, the cap member 22 is sandwiched between the ledge 12 on the housing shell 10 and a seal 50 adjacent the base 30. Alternately, the seal 50 may be omitted in favor of the friction force provided by the inner seal 39 disposed adjacent the filtered oil port 36, whereby the cap member 22 is sandwiched between the ledge 12 on the housing shell 10 and the inner seal 39 at the filtered oil port 36. It is within the scope of this invention to provide any type of retention system to maintain the filter media 21 and cap member 22 in fixed position within the housing shell 10 and base 30.

Figure 3A:
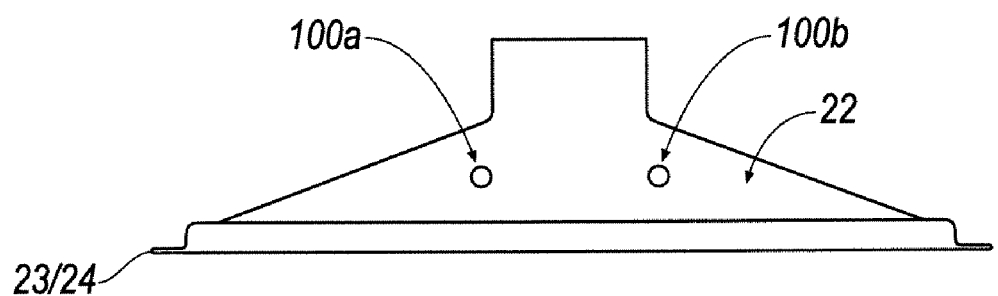
FIG. 3a is a side view of the cap member of this invention.
Figure 3B:
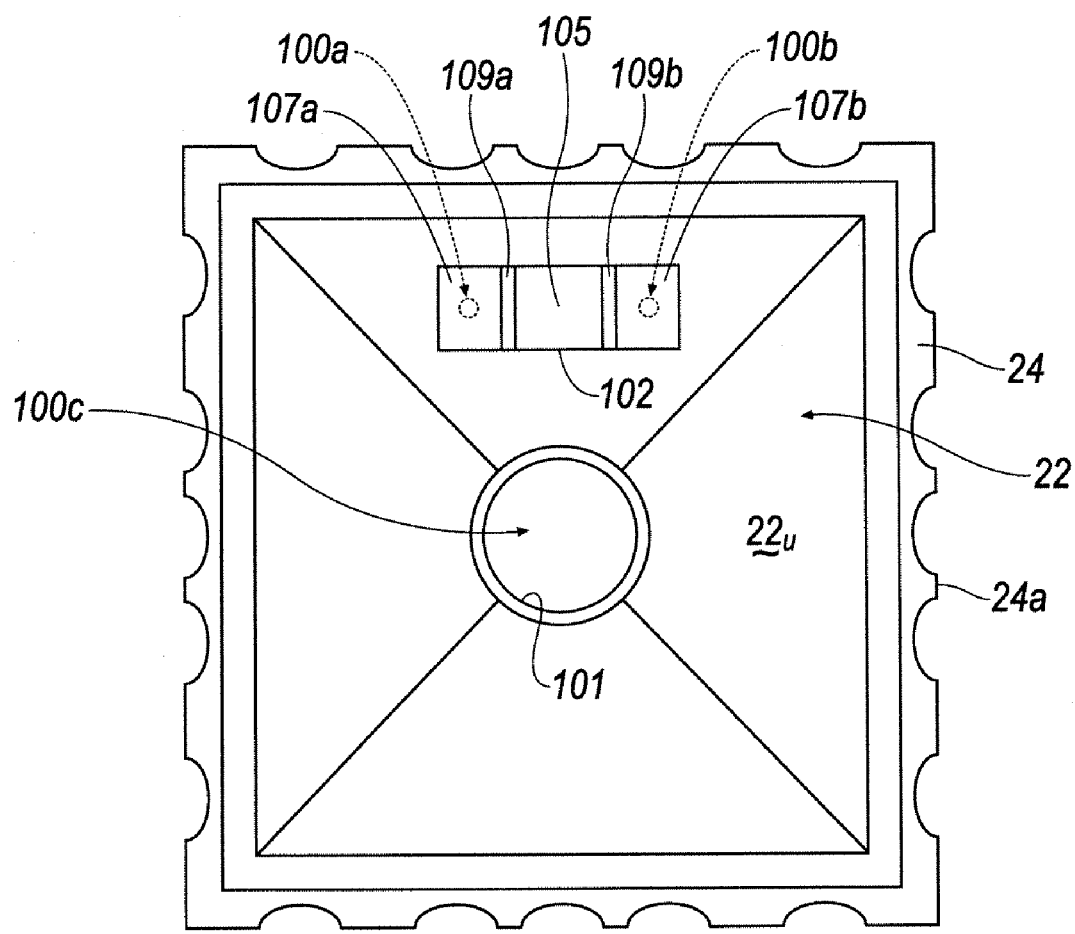
Figure 4A:
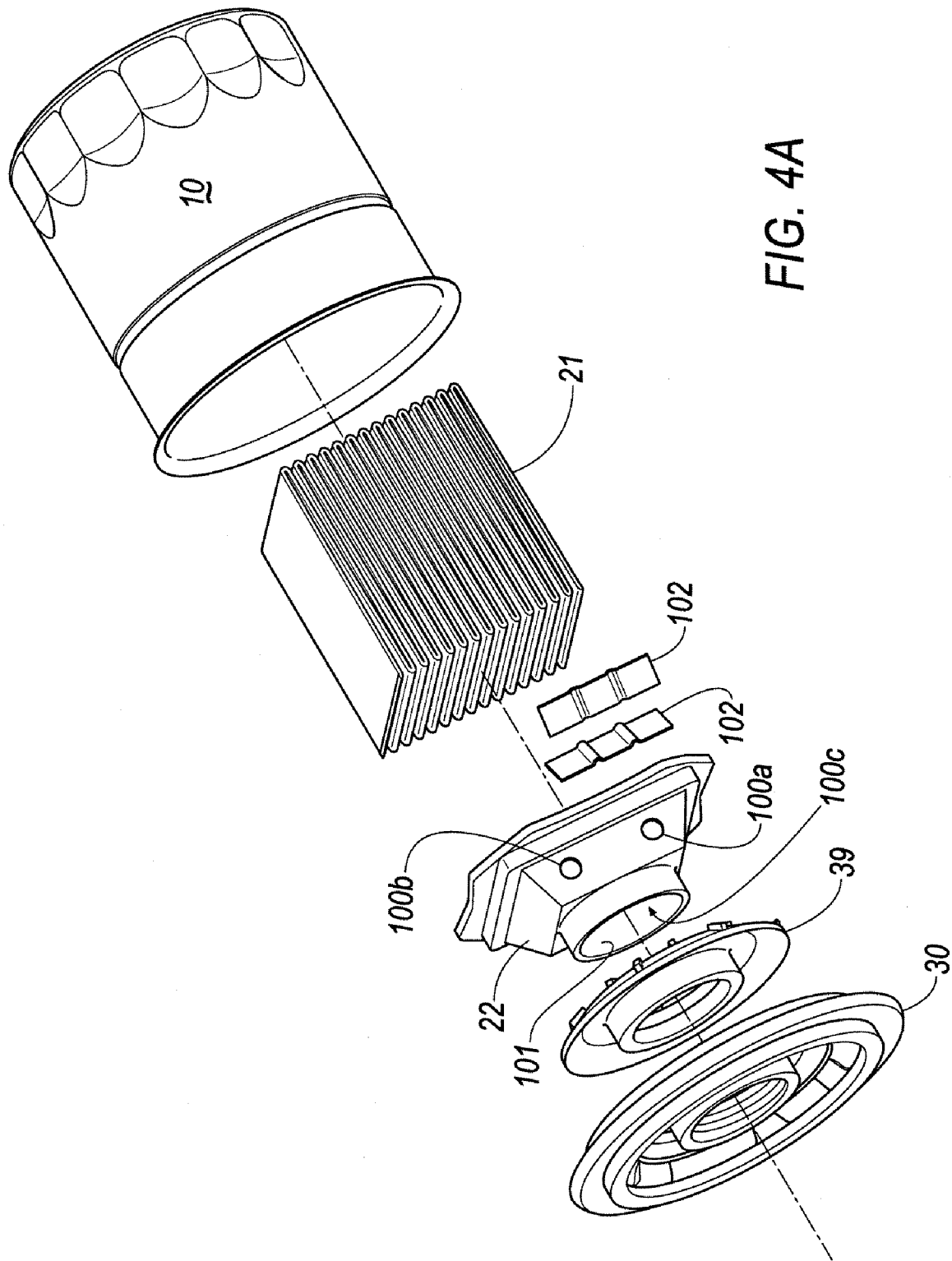
FIGS. 4a-4d show various views of the preferred design of the filter assembly according to the present invention as described above.
Figure 4B:
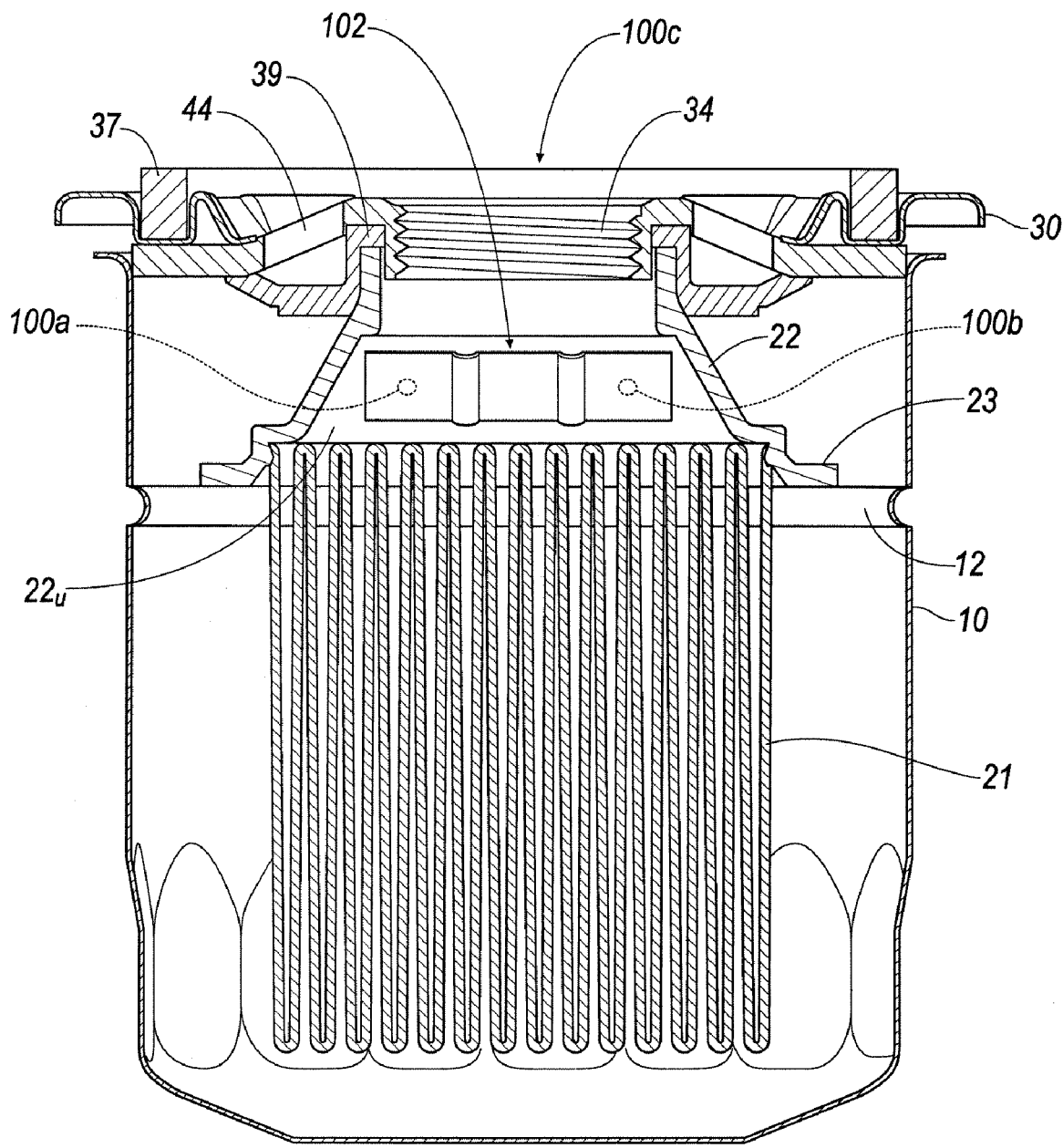
Figure 4C:
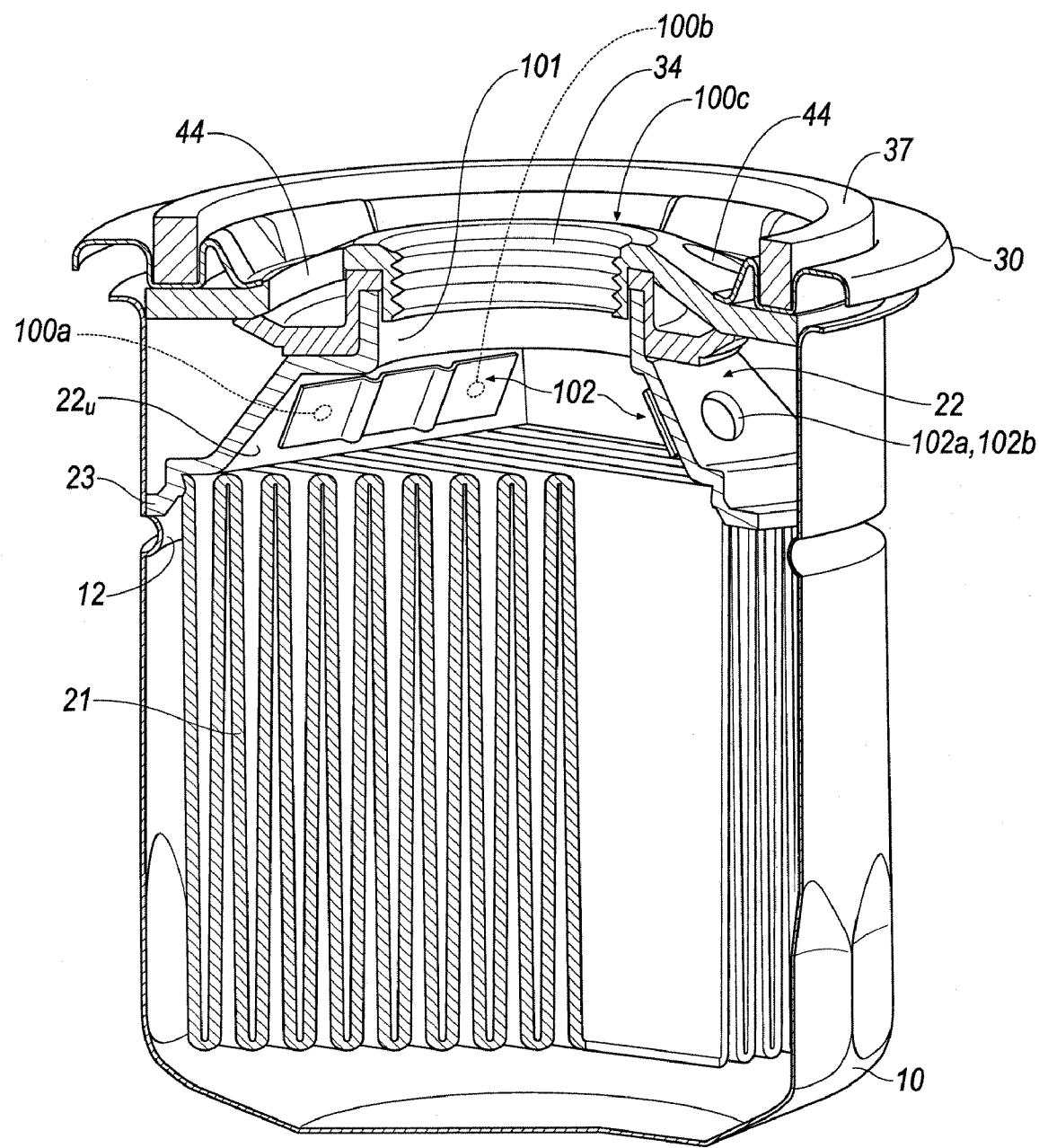
Figure 4D:
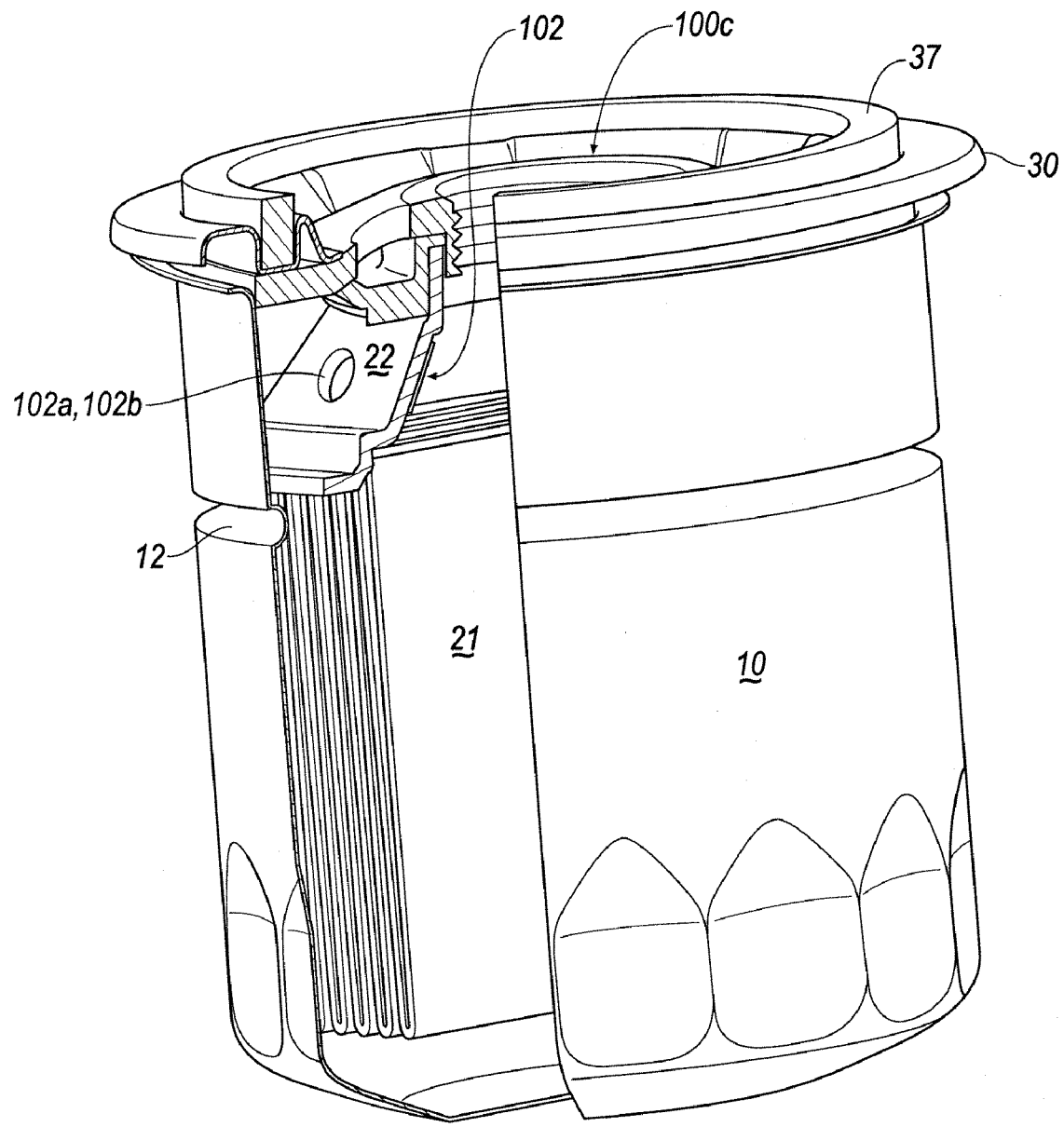

With reference to FIGS. 3a and 3b, the cap member 22 is shown with an emphasis on the shape and function of the mounting surface 24. As shown in FIG. 3b, the mounting surface 24 may be formed as a wave-shaped edge 24a to permit flow of the unfiltered oil from the unfiltered oil compartment 48 through the passageways defined by the wave-shaped edge 24a formed at the periphery of the cap member 22 and into the canister area 11 between the housing shell 10 and filter element 20. The ledge 12 is correspondingly formed to permit flow of unfiltered oil around the peripheral edge 24a of the cap member 22. Alternatively, suitable passageways may be provided at the interface of the rim 23 and ledge 12. The wave shaped edge 24a shown in FIG. 3b provides sufficient support for the cap member 22 and filter media 21 while permitting sufficient flow of oil from the compartment 48 to the canister area 11.

It should be understood that if filter element 12 becomes clogged with contaminants, pressure in the unfiltered fluid compartment 48 becomes very great due to oil being forced into canister area 11 through passageways at the periphery of the cap member. Therefore, this invention includes a pressure relief valve to provide a by-pass path for the unfiltered oil when the filter element becomes clogged. As the filter media becomes clogged, pressure builds up within the compartment 48 upstream of the valve holes 100a, 100b. As illustrated in FIGS. 3a, 3b, 4a and 4c, the valve holes 100a, 100b define upstream passages that are radially spaced and axially offset from a central aperture 101 defining a downstream passage 100c through the cap member 22. When the pressure differential reaches a predetermined force, pressure against valve holes 100a, 100b overcomes a mounting force of a pressure relief valve plate 102 causing a direct fluid communication through valve holes 100a, 100b between unfiltered fluid compartment 48 and hollow core leading to the filter oil port 36. This arrangement will allow unfiltered fluid to flow directly from the unfiltered fluid inlet orifices 44 through the unfiltered fluid compartment 48 and into port 36 to return to engine block through filtered oil tube.

As shown in FIGS. 3a and 3b, the end cap member 22 is shown with a pair of bypass valve holes 100a, 100b and the valve plate 102. FIGS. 4a-4d show various views of the preferred design of the filter assembly according to the present invention as described above.

Figure 5:
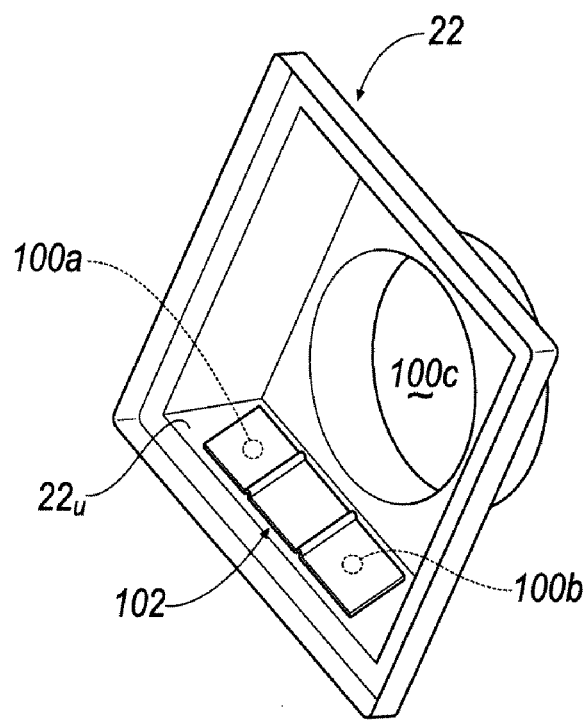
FIG. 5 is a schematic bottom view of an alternate embodiment of the cap member of FIG. 2 including a pressure relief valve.

FIG. 5 illustrates the valve plate 102 as mounted on the underside of the end cap member 22.

Figure 6:
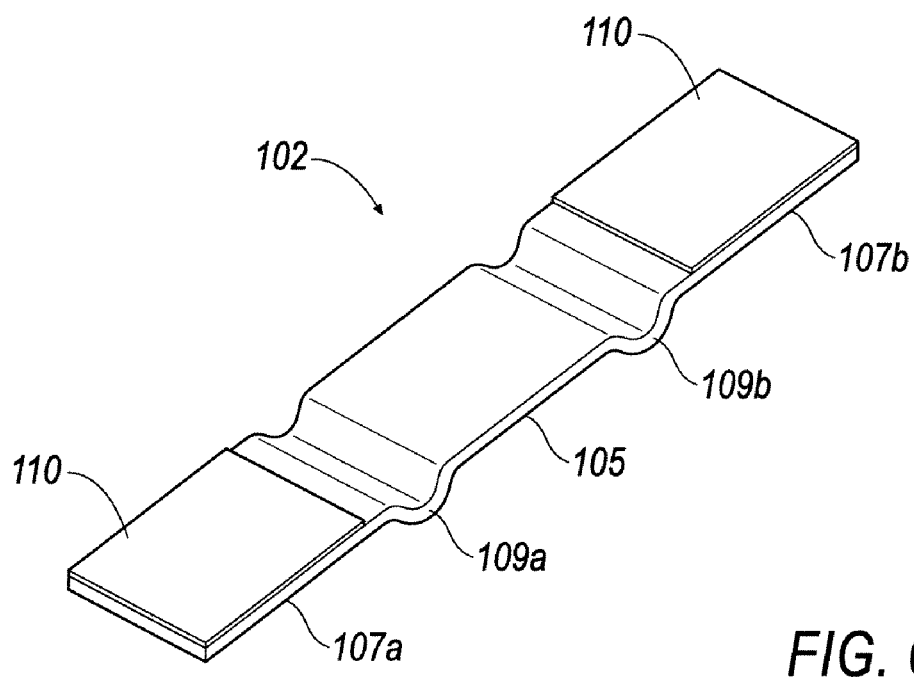
FIG. 6 is a perspective view of one embodiment of the valve plate according to the present invention.

With reference to FIG. 6, the valve plate 102 is preferably formed as a flat plate member having a central mounting section 105 and a pair of valve fingers 107a, 107b. Flex points 109a, 109b are disposed between the central mounting section 105 and the valve fingers 107a, 107b; respectively. In the preferred embodiment, each valve finger 107a, 107b is provided with a sealing coating 110 disposed on a side of each valve finger 107a, 107b facing the respective valve hole 100a, 100b. The sealing coating 110 serves to enhance the sealing effect provided by the valve fingers 107a, 107b on the valve holes 100a, 100b.

Figure 7A:
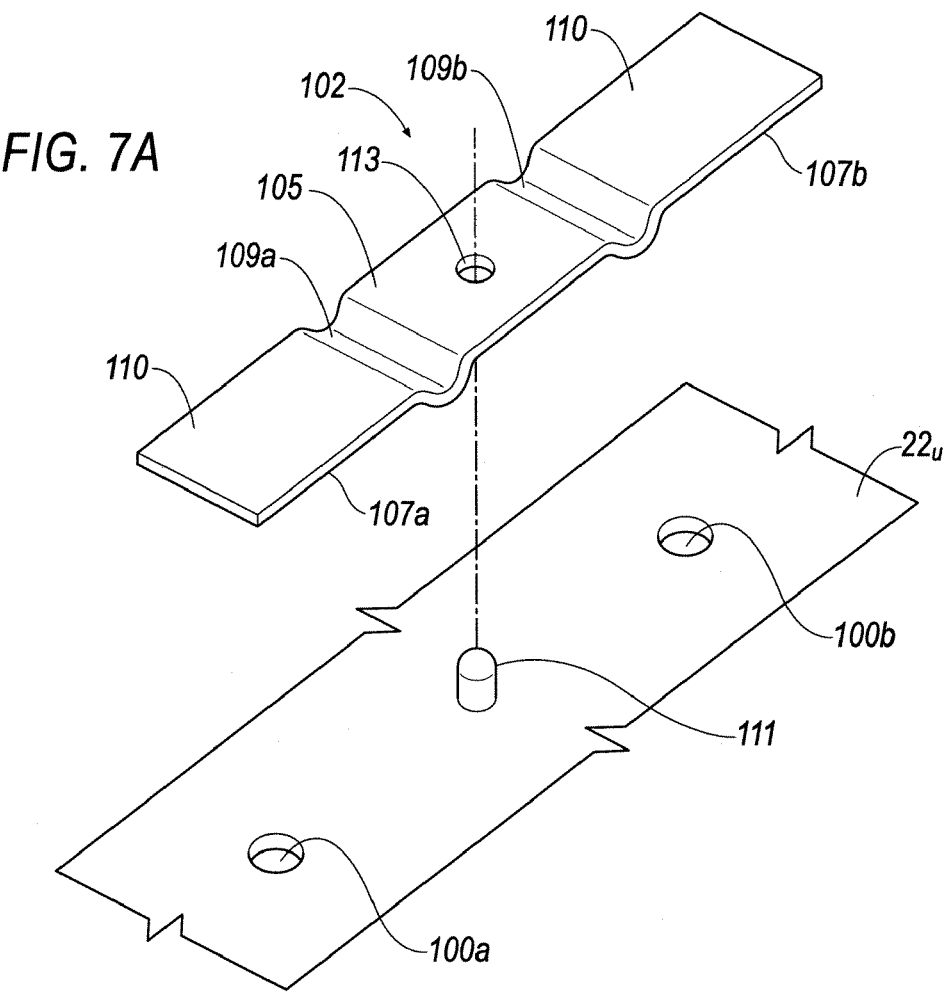
FIG. 7A is an exploded perspective view of one embodiment of a valve plate and a cap member according to the present invention.
Figure 7B:
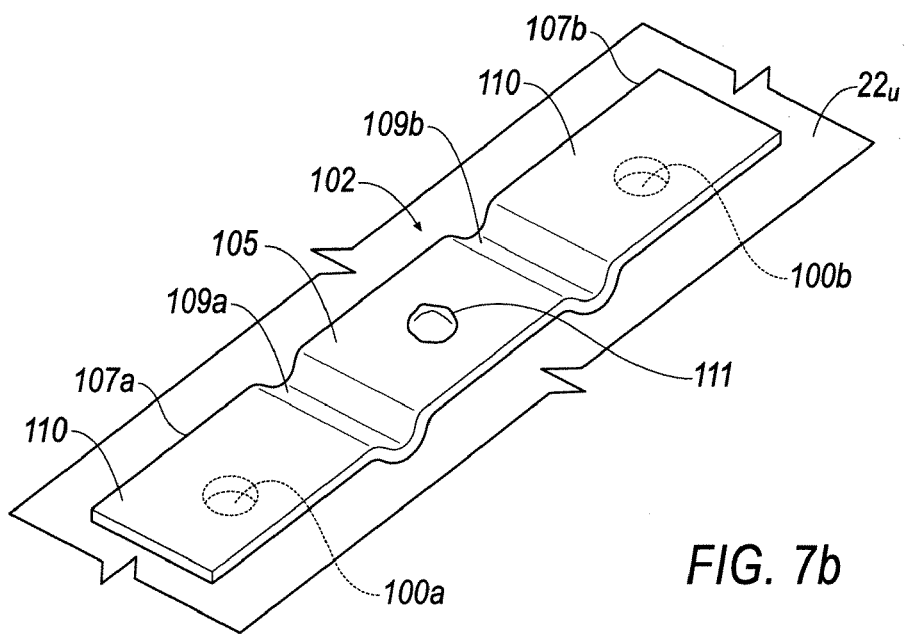
FIG. 7B is a perspective of the valve plate mounted and secured to the cap member according to FIG. 7A.

The valve plate 102 is mounted to the underside of the cap member 22 at the central mounting section 105 via a number of suitable methods including but not limited to welding, adhesive/epoxy, or a heat staking method. Referring to FIGS. 7A and 7B, in the heat staking method, the underside $22_u$ of the plastic cap member 22 is formed with a protrusion 111 during the plastic injection molding process. Thereafter, the valve plate 102, which—in this mounting arrangement—is formed with a central aperture 113 at the central mounting section 105, is positioned on the protrusion 111. Then, the protrusion 111 is melted to secure the valve member 102 onto the underside $22_u$ of the cap member 22.

With the valve plate 102 affixed to the cap member 22, the valve fingers 107a, 107b are positioned over the valve holes 100a, 100b to sealingly close the valve holes 100a, 100b.

The flex points 109a, 109b resiliently bias the valve fingers 107a, 107b against the valve holes 100a, 100b to selectively close the valve holes 100a, 100b and prevent flow of unfiltered oil from the unfiltered fluid compartment 48 through the valve holes 100a, 100b and into the hollow core leading to the filter oil port 36. The flex points 109a, 109b also serve to prevent deformation, wear and breakage of the valve plate 102 due to movement of the valve fingers 107a, 107b.

When the filter media 21 begins to clog, a pressure gradient is created in the unfiltered fluid compartment 48. As the pressure gradient reaches a predetermined level, the pressure level overcomes a closing force created by the valve plate 102 closing the valve holes 100a, 100b. When the pressure overcomes the closing force of the valve fingers 107a, 107b, unfiltered oil begins to flow through the bypass valve holes 100a, 100b; thereby, the unfiltered oil bypasses the filter media 21.

The sealing force generated by the valve plate 102 is determined by a number of factors including the size and number of the valve holes 100a, 100b, the size/thickness of the valve plate 102, the material forming the valve plate 102, and angle of the valve plate with respect to the pressure force. Specifically, the valve plate may be formed with an angle between the valve fingers 107a, 107b and the central mounting section to provide a non-planar arrangement between these components. In such a case, the closing force will be increased because the valve fingers are bent toward the valve holes and there is an increased closing force when the valve 20 plate 102 affixed to the end cap member 22.

It is significant to note that the dual valve hole and finger arrangement shown in the drawings is not intended to limit this invention because a single valve hole and a single valve finger may define the pressure relief valve of this invention. In such a case, the valve plate 102 has a mounting section for mounting the valve member to the end cap member 22 and single flex point between the mounting section and the single valve finger.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

The invention claimed is:

1. A filter assembly, comprising:
   a housing shell defining
      an inner surface, wherein the inner surface defines a canister area, and
      a radially-inward projecting ledge defined by the inner surface,
   a filter media positioned within the canister area,
   a cap member including
      a radially-outward projecting rim portion that engages the radially-inward projecting ledge of the housing shell,
      one or more upstream passages, and
      a downstream passage, wherein an underside of the cap member is disposed directly over the filter media;
   at least one pressure relief valve directly mounted to the underside of the cap member, wherein the at least one pressure relief valve resiliently closes-out the one or more upstream passages defined by the cap member; and
   a base including an unfiltered fluid channel and a filtered fluid port that is adapted to threadingly-engage the housing shell, wherein the radially-outward projecting rim portion of the cap member is sandwiched between the base and the radially-inward projecting ledge of the housing shell as the base threadingly-engages the housing shell.

2. The filter assembly according to claim 1, wherein the cap member includes a filtered-fluid port defining the downstream passage for passing a filtered-fluid there-through for subsequent passage through the filtered fluid port formed in the base.

3. The filter assembly according to claim 1, wherein the radially-outward projecting rim portion of the cap member is formed with a wave-shaped peripheral edge that defines an unfiltered fluid passage with the inner surface of the housing shell for passing an unfiltered fluid there-through that is received from the unfiltered fluid channel formed in the base.

4. The filter assembly according to claim 1, further comprising:
   a seal positioned between the base and the cap member.

5. The filter assembly according to claim 4, wherein the seal is circumferentially-disposed in the filtered fluid port formed in the base.

6. The filter assembly according to claim 4, wherein the seal is positioned between the radially-outward projecting rim portion of the cap member and an inside face of the base.

7. The filter assembly according to claim 1, wherein the at least one pressure relief valve arranged on the underside of the cap member is disposed between the cap member and the filter media.

8. The filter assembly according to claim 7, wherein the pressure relief valve opposingly-faces the filter media.

9. The filter assembly according to claim 7, wherein the at least one pressure relief valve comprises
   a substantially planar valve plate; and at least one sealing coating facing the one or more upstream passages.

10. The filter assembly according to claim 7, wherein the at least one pressure relief valve comprises:
   a mounting portion fixed to the underside of the cap member,
   at least one valve finger resiliently disposed with respect to the mounting portion, wherein the at least one valve finger is resiliently disposed adjacent the underside of the cap member and resiliently closes-out the one or more upstream passages, and
   at least one flex point disposed between the mounting portion and the at least one valve finger defining a resiliency of the at least one valve finger with respect to the mounting portion, wherein the mounting portion and the at least one valve finger defines planar members.

11. The filter assembly according to claim 1, wherein the filter media is formed to include a block of a continuous series of pleats extending across an entire width thereof such that no substantial opening is formed in the filter media to prevent passage of a center opening or compression spring through the filter media.

12. The filter assembly according to claim 1, wherein the at least one pressure relief valve includes a heat-stake passage, wherein the underside of the cap member includes a heat-stake protrusion that is extended through the heat-stake passage, wherein the protrusion is meltable in a heat-staking operation to secure and directly mount the at least one pressure relief valve adjacent the underside of the cap member.

13. The filter assembly according to claim 1, wherein the at least one pressure relief valve is directly mounted adjacent the underside of the cap member by way of welding or epoxy.

14. A filter assembly, comprising:
   a housing shell defining
      an inner surface, wherein the inner surface defines a canister area, and
      a radially-inward projecting ledge defined by the inner surface,
   a filter media positioned within the canister area,
   a cap member including
      a radially-outward projecting rim portion that engages the radially-inward projecting ledge of the housing shell,
      one or more upstream passages, and
      a downstream passage, wherein an underside of the cap member is disposed directly over the filter media,
   a base including an unfiltered fluid channel and a filtered fluid port that is adapted to threadingly-engage the housing shell, wherein the radially-outward projecting rim portion of the cap member is sandwiched between the base and the radially-inward projecting ledge of the housing shell as the base threadingly-engages the housing shell,
   a seal positioned between the base and the cap member, and
   at least one pressure relief valve directly mounted adjacent the underside of the cap member, wherein the at least one pressure relief valve resiliently closes-out the one or more upstream passages defined by the cap member.

15. The filter assembly according to claim 14, wherein the seal is positioned between the rim portion of the cap member and an inside face of the base.

16. The filter assembly according to claim 14, wherein the seal is circumferentially-disposed in the filtered fluid port formed in the base.

17. The filter assembly according to claim 14, wherein the filter media is formed to include a block of a continuous series of pleats extending across an entire width thereof such that no substantial opening is formed in the filter media to prevent passage of a center opening or compression spring through the filter media.

18. The filter assembly according to claim 14, wherein the cap member includes a filtered-fluid port defining the downstream passage for passing a filtered-fluid there-through for subsequent passage through the filtered fluid port formed in the base.

19. The filter assembly according to claim 14, wherein the radially-outward projecting rim portion of the cap member is formed with a wave-shaped peripheral edge that defines an unfiltered fluid passage with the inner surface of the housing shell for passing an unfiltered fluid there-through that is received from the unfiltered fluid channel formed in the base.

20. The filter assembly according to claim 14, wherein the at least one pressure relief valve arranged on the underside of the cap member is disposed between the cap member and the filter media.

21. The filter assembly according to claim 20, wherein the pressure relief valve opposingly-faces the filter media.

22. The filter assembly according to claim 20, wherein the at least one pressure relief valve comprises:
   a substantially planar valve plate; and
   at least one sealing coating facing the one or more upstream passages.

23. The filter assembly according to claim 20, wherein the at least one pressure relief valve comprises:
   a mounting portion fixed to the underside of the cap member,
   at least one valve finger resiliently disposed with respect to the mounting portion, wherein the at least one valve finger is resiliently disposed adjacent the underside of the cap member and resiliently closes-out the one or more upstream passages, and
   at least one flex point disposed between the mounting portion and the at least one valve finger defining a resiliency of the at least one valve finger with respect to the mounting portion, wherein the mounting portion and the at least one valve finger defines planar members.

24. The filter assembly according to claim 14, wherein the at least one pressure relief valve includes a heat-stake passage, wherein the underside of the cap member includes a heat-stake protrusion that is extended through the heat-stake passage, wherein the protrusion is meltable in a heat-staking operation to secure and directly mount the at least one pressure relief valve adjacent the underside of the cap member.

25. The filter assembly according to claim 14, wherein the at least one pressure relief valve is directly mounted to the underside of the cap member by way of welding or epoxy.

26. A filter assembly, comprising:
   a housing shell including a canister area,
   a filter media positioned within the canister area, wherein the filter media is formed to include a block of a continuous series of pleats extending across an entire width thereof such that no substantial opening is formed in the filter media to prevent passage of an object through the filter media,
   a cap member including an underside surface that is placed over the filter media and engages a top surface of the filter media, wherein the cap member defines
      one or more upstream passages for unfiltered fluid, and
      a downstream passage for filtered fluid; and
   at least one pressure relief valve mounted to the underside of the cap member, wherein the at least one pressure relief valve resiliently closes-out the one or more upstream passages defined by the cap member.

27. A filter assembly according to claim 26, wherein the housing shell defines an inner surface, wherein the inner surface defines the canister area, wherein the inner surfaces defines a radially-inward projecting ledge, wherein the cap member includes a radially-outward projecting rim portion that is adapted to engage the radially-inward projecting ledge of the housing shell.

28. The filter assembly according to claim 27, further comprising:
a base including an unfiltered fluid channel and a filtered fluid port that is adapted to threadingly-engage the housing shell, wherein the radially-outward projecting rim portion of the cap member is sandwiched between the base and the radially-inward projecting ledge as the base threadingly-engages the housing shell.

29. The filter assembly according to claim 28, wherein the cap member includes a filtered-fluid port defining the downstream passage for passing a filtered-fluid there-through for subsequent passage through the filtered fluid port formed in the base.

30. The filter assembly according to claim 28, wherein the rim portion is formed with a wave-shaped peripheral edge that defines an unfiltered fluid passage with the inner surface of the housing shell for passing an unfiltered fluid there-through that is received from the unfiltered fluid channel formed in the base.

31. The filter assembly according to claim 28, further comprising:
a seal positioned between the base and the cap member.

32. The filter assembly according to claim 31, wherein the seal is circumferentially-disposed in the filtered fluid port formed in the base.

33. The filter assembly according to claim 28, where the seal is positioned between the radially-outward projecting rim portion of the cap member and an inside face of the base.

34. The filter assembly according to claim 26, wherein the at least one pressure relief valve comprises a plurality of valves actuated at various differential pressures allowing different by-pass paths.

35. The filter assembly according to claim 26, wherein the at least one pressure relief valve comprises
a substantially planar valve plate; and
at least one sealing coating facing the one or more upstream passages.

36. The filter assembly according to claim 26, wherein the at least one pressure relief valve comprises:
a mounting portion fixed to the underside of the cap member,
at least one valve finger resiliently disposed with respect to the mounting portion, wherein the at least one valve finger is resiliently disposed adjacent the underside of the cap member and resiliently closes-out the one or more upstream passages, and
at least one flex point disposed between the mounting portion and the at least one valve finger defining a resiliency of the at least one valve finger with respect to the mounting portion, wherein the mounting portion and the at least one valve finger defines planar members.

37. The filter assembly according to claim 26, wherein the at least one pressure relief valve is disposed between said cap member and filter media, wherein the at least one pressure relief valve is arranged on the underside of the cap member to opposingly-face the filter media defined by the block of continuous series of pleats extending across the entire width of the canister area of the housing shell.

38. The filter assembly according to claim 26, wherein the at least one pressure relief valve includes a heat-stake passage, wherein the underside of the cap member includes a heat-stake protrusion that is extended through the heat-stake passage, wherein the protrusion is meltable in a heat-staking operation to secure and directly mount the at least one pressure relief valve adjacent the underside of the cap member.

39. The filter assembly according to claim 26, wherein the at least one pressure relief valve is directly mounted adjacent the underside of the cap member by way of welding or epoxy.

* * * * *